(12) United States Patent
Kobayashi et al.

(10) Patent No.: US 8,878,523 B2
(45) Date of Patent: Nov. 4, 2014

(54) INDUCTIVE DETECTION ENCODER AND DIGITAL MICROMETER

(75) Inventors: Hirokazu Kobayashi, Kawasaki (JP); Osamu Kawatoko, Kawasaki (JP); Shozaburo Tsuji, Kawasaki (JP); Kenichi Nakayama, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 189 days.

(21) Appl. No.: 13/616,152

(22) Filed: Sep. 14, 2012

(65) Prior Publication Data

US 2013/0069637 A1   Mar. 21, 2013

(30) Foreign Application Priority Data

Sep. 16, 2011   (JP) .................................. 2011-203743

(51) Int. Cl.
  *G01B 7/14*   (2006.01)
  *G01D 5/20*   (2006.01)
(52) U.S. Cl.
  CPC ....................................... *G01D 5/208* (2013.01)
  USPC ............ 324/207.17; 324/207.13; 324/207.15; 324/207.16; 324/207.25
(58) Field of Classification Search
  USPC ............. 324/207.17, 207.16, 207.15, 207.13, 324/207.25, 206, 256, 257, 259, 260
  See application file for complete search history.

(56) References Cited

U.S. PATENT DOCUMENTS

| | | | | |
|---|---|---|---|---|
| 2003/0080733 | A1* | 5/2003 | Miyata et al. | 324/207.17 |
| 2005/0122197 | A1* | 6/2005 | Aoki et al. | 336/115 |
| 2005/0169044 | A1* | 8/2005 | Hosotani | 365/158 |
| 2007/0228515 | A1* | 10/2007 | Asahi | 257/531 |
| 2009/0195241 | A1* | 8/2009 | Nakayama et al. | 324/207.17 |
| 2009/0309579 | A1* | 12/2009 | Cochran | 324/207.16 |
| 2010/0102803 | A1* | 4/2010 | Kobayashi | 324/207.25 |
| 2010/0231206 | A1* | 9/2010 | Kobayashi | 324/207.25 |

FOREIGN PATENT DOCUMENTS

JP   2010-210472   9/2010

* cited by examiner

*Primary Examiner* — Huy Q Phan
*Assistant Examiner* — David Frederiksen
(74) *Attorney, Agent, or Firm* — Rankin, Hill & Clark LLP

(57) ABSTRACT

An inductive detection encoder according to the present invention includes: first and second members which are oppositely disposed so as to relatively move in a measurement direction; a transmitting coil formed in the first member; a magnetic flux coupled body which is formed in the second member and coupled with a magnetic field generated by the transmitting coil; and a receiving coil formed in the first member and having receiving loops. At least one of the transmitting coil and the receiving coil has a specific pattern that impairs the uniformity and periodicity of a pattern; and a dummy pattern formed in a position corresponding to a specific phase relationship of a cycle generated by the track with respect to the specific pattern.

18 Claims, 12 Drawing Sheets

1 (FIRST EMBODIMENT)

11 (FIRST EMBODIMENT)

INDUCTIVE DETECTION ENCODER AND DIGITAL MICROMETER

CROSS-REFERENCE TO RELATED APPLICATIONS

This application is based upon and claims the benefit of priority from the prior Japanese Patent Application No. 2011-203743, filed on Sep. 16, 2011, the entire contents of which are incorporated herein by reference.

BACKGROUND OF THE INVENTION

1. Field of the Invention

The present invention relates to an inductive detection encoder and a digital micrometer which measure a position and a size of an object using magnetic flux coupling between wiring lines.

2. Description of the Related Art

An inductive detection encoder, which allows an inductive current to flow in a magnetic flux coupling coil by a transmitting coil and receives the inductive current by a receiving coil to measure a relative position of the magnetic flux coupling coil and the receiving coil, is known (see Japanese Published Patent Application No. 2010-210472). The inductive detection encoder has excellent resistance to the environment and is used for various purposes such as a linear encoder or a rotary encoder.

The inductive detection encoder measures the position using an inductive current. For example, in the case of a rotary encoder, a transmitting coil is formed in a circular shape and a magnetic flux coupling coil is formed to be a gear shape or a loop shape so as to be arranged in a circumferential direction with a predetermined interval. An alternating current flows into the transmitting coil to generate a magnetic field, which causes the inductive current to flow in the magnetic flux coupling coil. A periodic magnetic field pattern in the measurement direction generated by the inductive current is detected by the receiving coil. Therefore, if the transmitting coil is ideally circular and the receiving coil has a uniform shape in a circumferential direction, it is expected to obtain an ideal signal in the receiving coil.

However, a leading wiring unit needs to be provided in the transmitting coil so as to supply a power and a leading wiring unit needs to be provided in the receiving coil so as to draw a signal. Accordingly, the disturbance in the magnetic field generated in the leading wiring units affects a reception signal generated by the receiving coil, which causes a measurement error.

SUMMARY OF THE INVENTION

The present invention has been made in an effort to provide an inductive detection encoder and a digital micrometer which allow high precise measurement.

An inductive detection encoder according to the present invention includes: first and second members which are oppositely disposed so as to relatively move in a measurement direction; a transmitting coil formed in the first member; a magnetic flux coupled body which is formed in the second member and coupled with a magnetic field generated by the transmitting coil to generate a track in which the magnetic field is periodically changed in the measurement direction; and a receiving coil formed in the first member and having receiving loops periodically formed along the measurement direction corresponding to the track of the magnetic flux coupled body. At least one of the transmitting coil and the receiving coil having: a specific pattern that impairs the uniformity and periodicity of a pattern; and a dummy pattern formed in a position corresponding to a specific phase relationship of a cycle generated by the track with respect to the specific pattern.

With this configuration, an inductive current generated by a specific pattern of the wiring line leading unit and the wiring line formed at least one of a transmitting coil and a receiving coil is cancelled by a dummy pattern and an inductive detection encoder which allows high precise measurement may be provided. Further, this configuration may be applied to various encoders such as a linear encoder or a rotary encoder.

In some embodiments of the present invention, the specific pattern is a wiring line leading unit and a leading wiring line configured to lead a wiring line from at least one of the transmitting coil and the receiving coil.

Further, in some embodiments of the present invention, the first member includes: a first wiring layer having a part of the receiving coil and the transmitting coil; and a second wiring layer having the remaining part of the receiving coil that forms the receiving coil together with the part of the receiving coil in the first layer, and the leading wiring line configured to lead the wiring line from the receiving coil and the dummy pattern are formed on the same wiring layer other than the first wiring layer. With this configuration, it is possible to reduce the number of components without impairing measurement precision.

Further, a portion where the leading wiring line and the dummy pattern are formed may be appropriately adjusted. For example, it is considered to further provide a third wiring layer having a magnetic shield wiring line and a fourth wiring layer having the leading wiring line and the dummy pattern in the first member. Further, it is also considered to provide the leading wiring line and the dummy pattern in a second wiring layer.

Further, in some embodiments of the present invention, the receiving coil is formed of multiple phase coils whose phases in the measurement direction are varied, and the specific pattern and the dummy pattern are formed in the transmitting coil and formed close to a specific phase coil of the receiving coil.

Further, in some embodiments of the present invention, the specific pattern and the dummy pattern are formed in the receiving coil so as to make the currents flowing in the receiving coil generated by being coupled with the transmitting coil be reverse to each other.

Further, a specific phase relationship between the specific pattern and the dummy pattern and a shape of the dummy pattern may be appropriately adjusted. For example, when a wavelength of the receiving coil in the measurement direction is $\lambda$, the specific pattern and the dummy pattern may be formed to be the same patterns in locations spaced apart from each other by $(n+\frac{1}{2})\lambda$ (in this case, n is an arbitrary integer). Alternatively, the specific pattern and the dummy pattern may be formed in locations spaced apart from each other by $n\lambda$ (in this case, n is an arbitrary integer) as patterns which affect the receiving coil in reverse directions. In the latter, if the transmitting coil has the specific pattern and the dummy pattern, it is considered that the specific pattern is a pattern which is led outside the transmitting coil and patterns that extend inside the transmitting coil are provided as the pattern that affects the receiving coil in reverse directions. In the meantime, if the receiving coil has the specific pattern and the dummy pattern, it is considered that a pattern same as the specific pattern is formed as the dummy pattern and connecting edges of the dummy pattern with the receiving coil are switched.

Further, in some embodiments of the present invention, the transmitting coil includes a first transmitting coil and a second transmitting coil which are independently formed in the first member, the magnetic flux coupled body includes first and second magnetic flux coupled bodies which are independently formed in the second member and respectively coupled with the magnetic fields generated by the first and second transmitting coils to generate tracks in which the magnetic field in the measurement direction is periodically changed, and the receiving coil includes first and second receiving coils which are independently formed in the first member and have receiving loops which are periodically formed along the measurement direction corresponding to the tracks of the first and second magnetic flux coupled bodies. In other words, the present invention is also applied to two track type inductive detection encoder. In this case, in the first and second transmitting coils and the first and second receiving coils, the dummy patterns are formed respectively. With this configuration, it is possible to improve the measurement precision of the inductive detection encoder. Further, it is also considered that a cycle generated by the track of the first magnetic flux coupled body is odd-numbered and a cycle generated by the track of a second magnetic flux coupled body is even numbered to form an ABS (absolute position detection) type encoder.

Further, the digital micrometer according to an embodiment of the present invention is configured by mounting the above-mentioned inductive detection encoder therein.

DETAILED DESCRIPTION

[First Embodiment]
[Configuration of Digital Micrometer According to First Embodiment]

Figure 1:
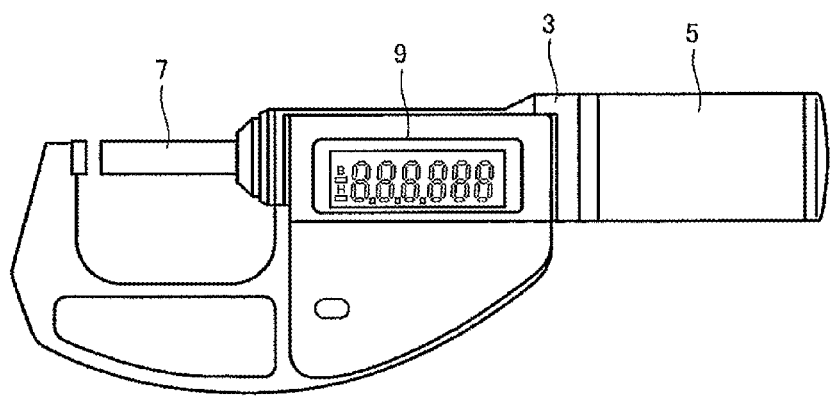
FIG. 1 is a front view of a digital micrometer according to a first embodiment of the present invention in which an inductive detection rotary encoder is mounted.

A configuration of a digital micrometer 1 according to a first embodiment of the present invention in which an inductive detection rotary encoder is mounted will be described with reference to FIG. 1. FIG. 1 is a front view of the digital micrometer 1. A thimble 5 is rotatably fitted in a frame 3 of the digital micrometer 1. A spindle 7 which is a gauge head is rotatably supported in the frame 3.

One edge of the spindle 7 outwardly protrudes to abut onto a measurement target. In the meantime, a feed screw (which is not illustrated in FIG. 1) is formed at the other edge of the spindle 7. The feed screw is fitted to a nut in the thimble 5.

In this configuration, if the thimble 5 rotates in a positive direction, the spindle 7 moves forward along an axial direction of the spindle 7. If the thimble 5 rotates in reverse directions, the spindle 7 moves backward along the axial direction of the spindle 7. A liquid crystal display 9 is provided in the frame 3 so as to display a measurement value of the digital micrometer 1.

[Configuration of Inductive Detection Rotary Encoder 11 According to First Embodiment]

Figure 2:
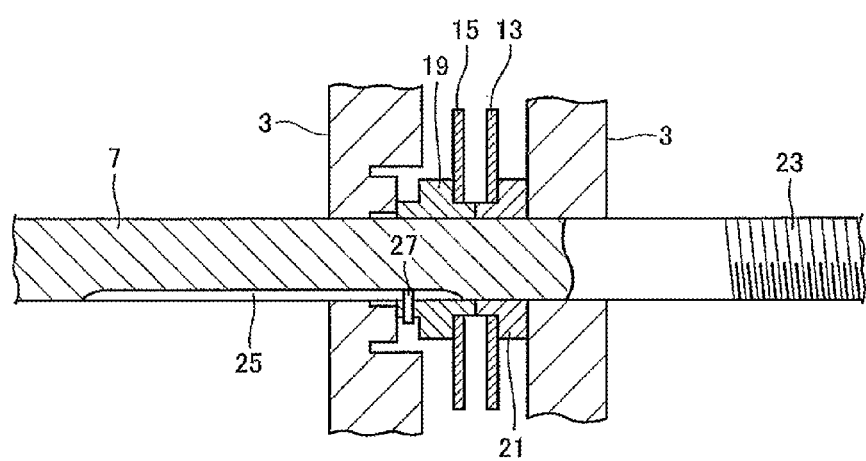
FIG. 2 is a cross-sectional view of an inductive detection rotary encoder according to an embodiment of the present invention which is mounted in the micrometer.

Next, a configuration of an inductive detection rotary encoder 11 according to a first embodiment which is mounted in the digital micrometer 1 of FIG. 1 will be described with reference to FIG. 2. FIG. 2 is a cross-sectional view of the inductive detection rotary encoder 11.

The inductive detection rotary encoder 11 includes a stator 13 and a rotor 15 which is rotatable with spindle 7 about the rotational axis and disposed so as to be opposite to the stator 13. The rotor 15 is fixed onto an end face of a cylindrical rotor bush 19. The spindle 7 is inserted into the rotor bush 19. The stator 13 is fixed onto an end face of a cylindrical stator bush 21. The stator bush 21 is fixed to the frame 3.

A feed screw 23 which is fitted to a nut disposed in the thimble 5 of FIG. 1 is formed on a surface of the spindle 7. Further, on the surface of the spindle 7, a key groove 25 is engraved along a length direction of the spindle 7 (that is, forward and backward movement direction of the spindle 7). A front edge of a pin 27 fixed to the rotor bush 19 is fitted in the key groove 25. If the spindle 7 rotates, a torque thereof is transmitted to the rotor bush 19 through the pin 27 to rotate the rotor 15. In other words, the rotor 15 rotates in conjugation with the rotation of the spindle 7. The pin 27 is not fixed to the key groove 25 so that the rotor 15 may rotate without moving the rotor 15 together with the spindle 7 in the forward and backward movement direction of the spindle 7.

[Configuration of Stator According to First Embodiment]

Figure 3:
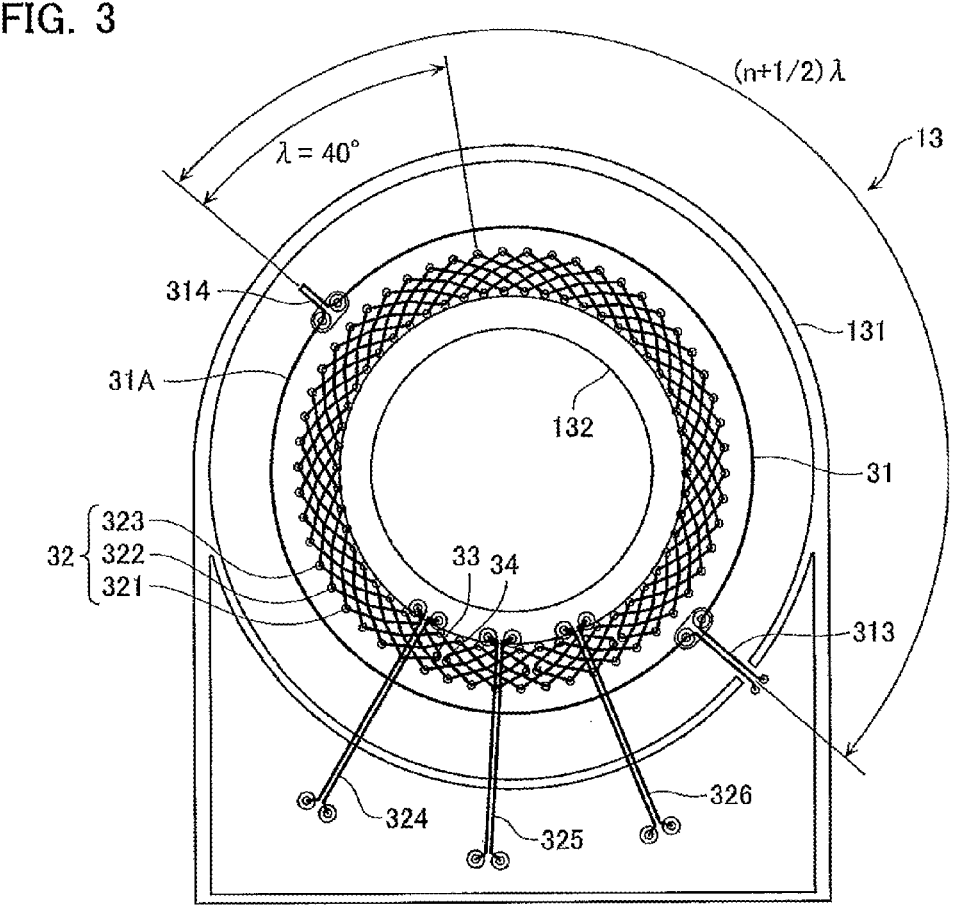
FIG. 3 is a view illustrating a configuration example of a stator of the micrometer.
Figure 4:
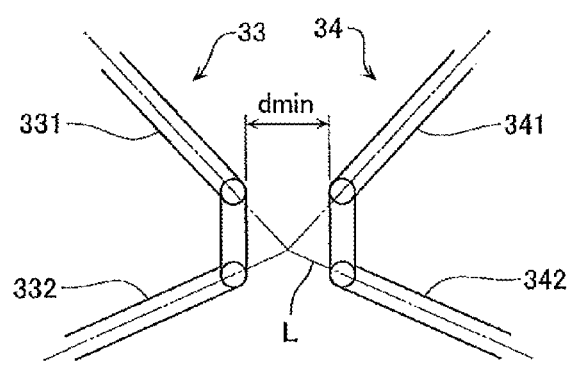
FIG. 4 is a view illustrating a folded portion of the stator.

Next, a configuration of the stator 13 will be described with reference to FIGS. 3 to 8. FIG. 3 is a plan view illustrating an entire configuration of the stator 13 and FIG. 4 is an enlarged view of folded portions 33 and 34 of the stator 13.

As illustrated in FIG. 3, the stator 13 includes a stator main body 131 having a through hole 132, a transmitting coil 31 and a receiving coil 32 which are coaxially formed with the through hole 132 in the stator main body 131. The stator main body 131 is, for example, formed of a multilayered resin substrate and a circuit pattern formed thereon forms the transmitting coil 31 and the receiving coil 32.

The transmitting coil 31 has a circular transmitting unit 31A formed outside the receiving coil 32, a leading wiring line 313 which is outwardly led from a wiring line leading unit of the transmitting unit 31A, and a dummy wiring line 314 which is formed with the same pattern as the leading wiring line 313 and outwardly led from another position of the transmitting unit 31A.

The receiving coil 32 is circularly disposed inside the transmitting coil 31 and configured by three phase receiving coils 321 to 323 whose phases are varied by 120° in a rotational direction. Each of the receiving coils 321 to 323 has a convex portion protruding toward the outer circumferential direction and a concave portion protruding toward a central direction and the convex portions and the concave portions are arranged at regular interval in the circumferential direction with a predetermined period. Here, an angle of the convex portion and concave portion pair in the circumferential direction is defined as a "wavelength $\lambda$". In this embodiment, each of the receiving coils 321 to 323 is formed of 18 receiving loops (rhombic shape) formed by electrically connecting a wiring line in which nine pairs of convex portions and concave portions are formed at every 40° and a wiring line having a different phase by 180° in which the concave portions and convex portions of the above wiring line are reversely formed, to the folded portions 33 and 34. The receiving loops are circularly disposed. Accordingly, in the range of the wavelength $\lambda$, total six receiving loops are arranged with phases which are varied approximately by 6.7° (exactly, 20°/3).

The folded portions 33 and 34, as illustrated in FIG. 4, secure a minimum space (dmin) for a design rule near a cross point of an ideal wiring line shape L to be disposed to be opposite to each other. The folded portion 33 is formed of wiring lines 331 and 332 and the folded portion 34 is formed of wiring lines 341 and 342.

Further, the receiving coil 32 has leading wiring lines 324 to 326 which extend from both ends of the receiving coils 321 to 323 to the outer circumference of the stator main body 131.

The above-mentioned transmitting coil 31 and the receiving coil 32 may be formed of, for example, a multilayered wiring substrate. Here, an example that the transmitting coil 31 and the receiving coil 32 are formed of four resin wiring substrates will be described with reference to FIGS. 5 to 8. As illustrated in FIGS. 5 to 8, the stator 13 is configured to have four wiring layers 13A, 13B, 13C, and 13D.

Figure 5:
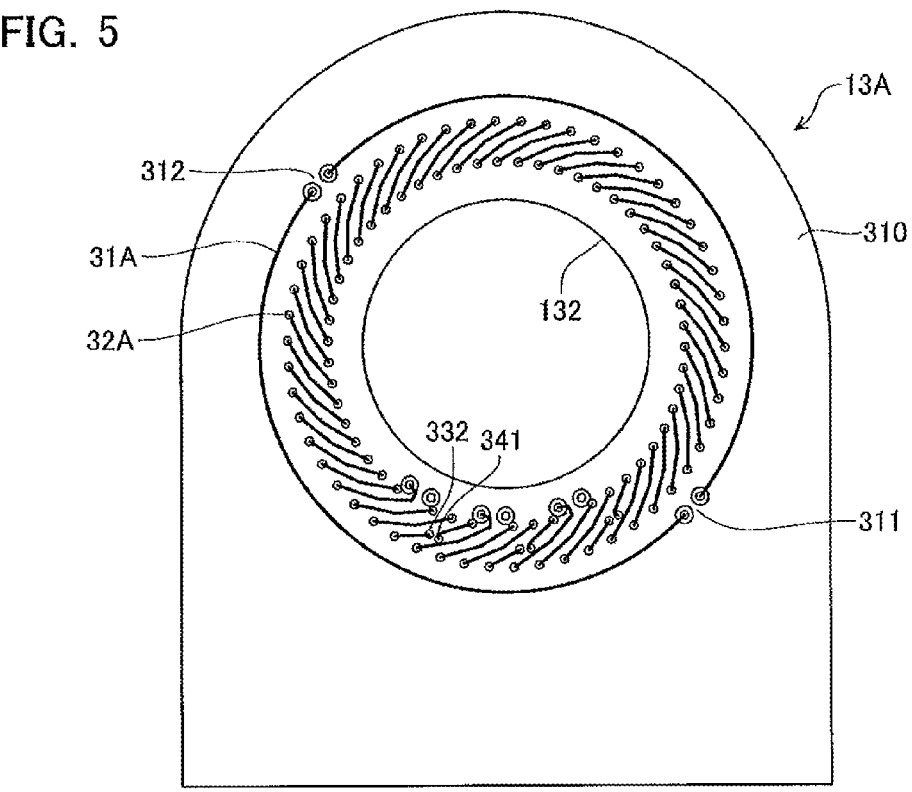
FIG. 5 is a view illustrating a first wiring layer of the stator.

As illustrated in FIG. 5, a first wiring layer 13A has a transmitting unit 31A of the transmitting coil 31 formed on the wiring substrate 310 and a wiring line 32A which is a part of the receiving coil 32. The transmitting unit 31A of the transmitting coil 31 is a circular wiring line having a wiring line leading unit 311 for supplying power and a dummy wiring line connecting unit 312 for connection of a dummy wiring line 314. Here, the dummy wiring line 314 and the dummy wiring line connecting unit 312 are referred to as a "dummy pattern". The wiring line leading unit 311 and the dummy wiring line connecting unit 312 are formed with the same pattern at a substantially same interval and disposed in a position indicating the relationship of $(n+\frac{1}{2})\lambda$ (n is an arbitrary integer) as illustrated in FIG. 3. In this example, n is 4 and the dummy wiring line connecting unit 312 is formed in a point symmetrical position with respect to the wiring line leading unit 311 with a center of the spindle 7 as a reference. The wiring line 32A is formed of a plurality of wiring lines arranged inside the transmitting unit 31A and the plurality of wiring lines are arranged such that outer circumferential edges are spirally and radially arranged with respect to inner circumferential edges so as to be inclined in a clockwise direction. Further, three parts of the wiring line 32A are partially disconnected to configure the wiring lines 332 for the folded portions 33 and the wiring lines 341 for the folded portion 34.

Figure 6:
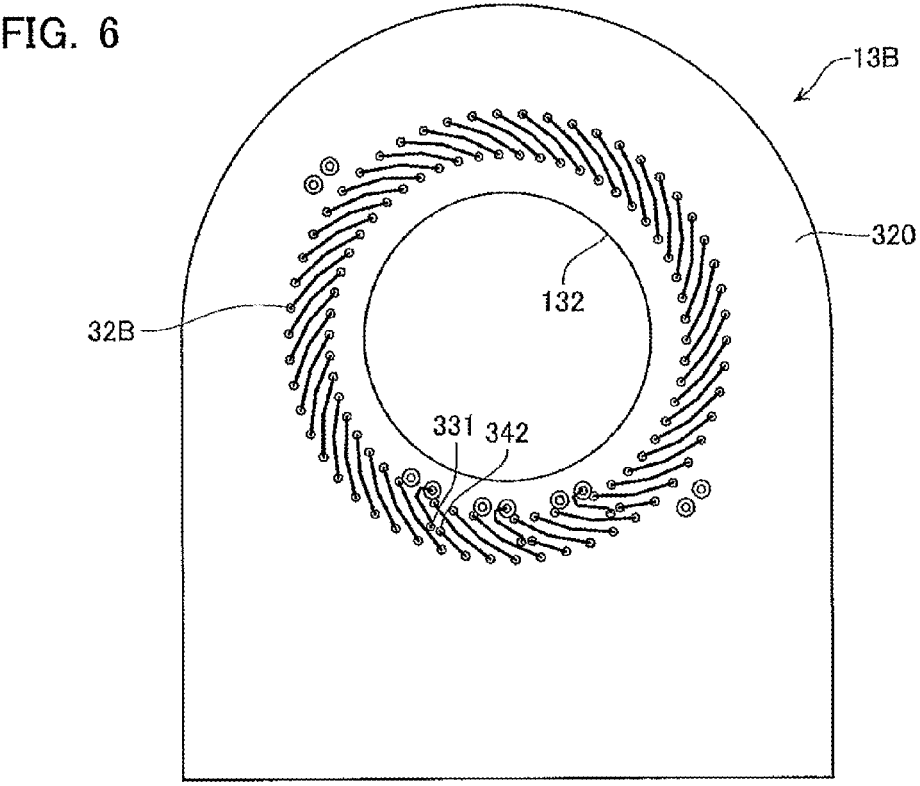
FIG. 6 is a view illustrating a second wiring layer of the stator.

As illustrated in FIG. 6, a second wiring layer 133 has a wiring line 32B which is a part of the receiving coil 32 formed on the wiring substrate 320. The wiring line 323 is also configured by a plurality of wiring lines, which is similar to the wiring line 32A. The plurality of wiring lines are arranged such that outer circumferential edges are spirally and radially arranged with respect to inner circumferential edges so as to be inclined in a counterclockwise direction. The wiring line 323 is electrically connected with the wiring line 32A through a contact hole formed in the wiring substrate 310 to configure the receiving coil 32. The wiring line 323 is partially disconnected to configure the wiring lines 331 for the folded portions 33 and the wiring lines 342 for the folded portions 34. The wiring lines 331 and 342 are electrically connected with the wiring lines 332 and 341 through the contact hole.

Figure 7:
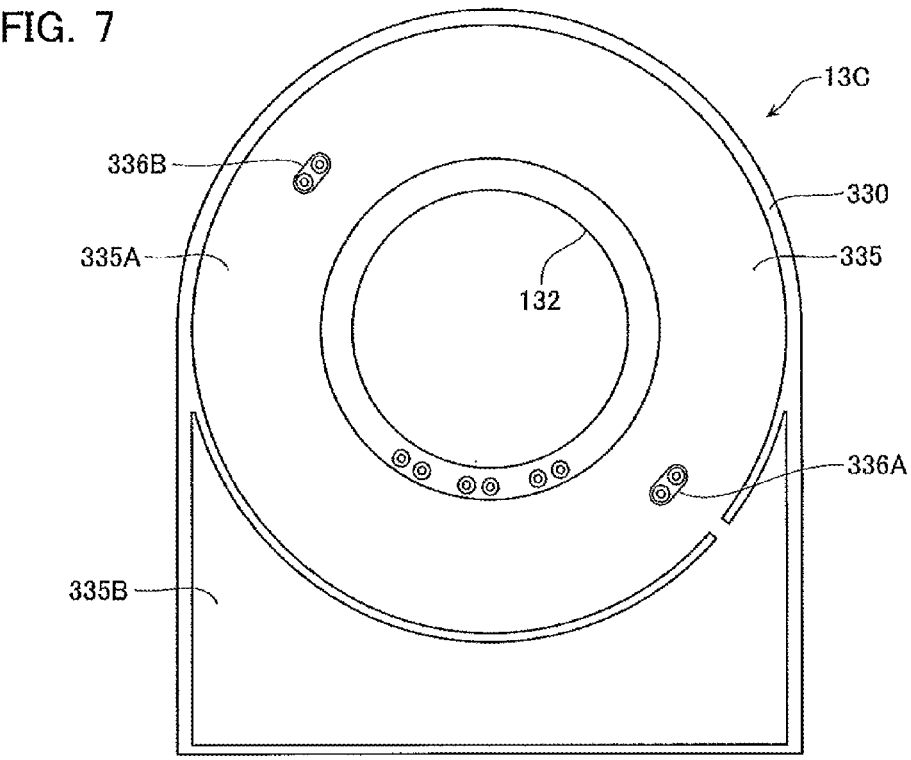
FIG. 7 is a view illustrating a third wiring layer of the stator.

As illustrated in FIG. 7, a third wiring layer 13C forms a magnetic circuit having a magnetic field generated by the transmitting coil 31 and a magnetic field received by the receiving coil 32 on a rear surface of the first and second wiring layers 13A and 13B and serves as a magnetic shield with respect to a fourth wiring layer 13D. The third wiring layer 13C is formed by a magnetic shield wiring line 335 formed on the wiring substrate 330. The magnetic shield wiring line 335 has a circular portion 335A that forms a magnetic circuit for transmission and reception and a wiring line shielding unit 335B that shields the leading wiring lines 313 and 324 to 326. Further, the magnetic shield wiring line 335 has holes 336A and 336B through which the wiring line leading unit 311 and the contact hole of the dummy wiring line connecting unit 312 pass.

Figure 8:
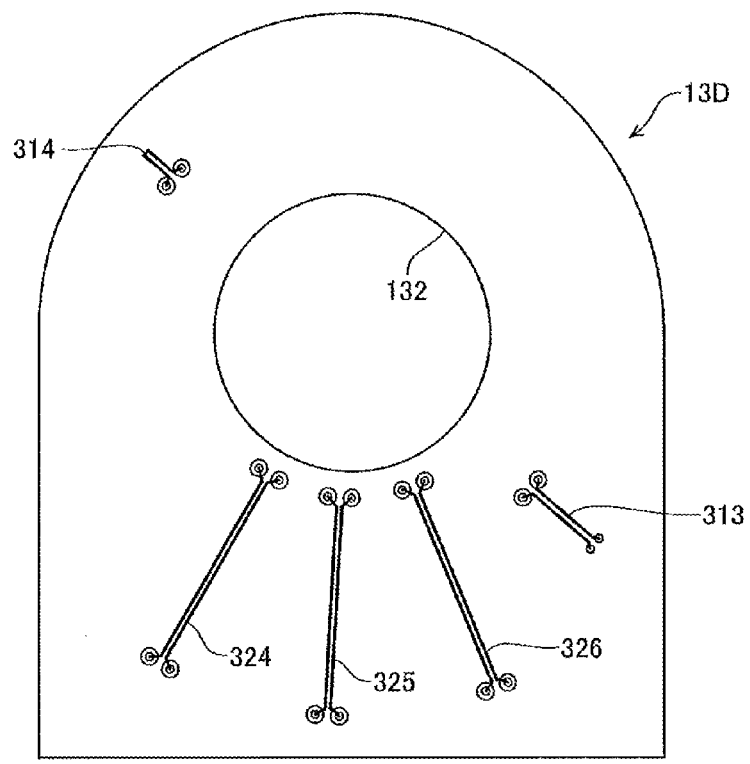
FIG. 8 is a view illustrating a fourth wiring layer of the stator.

As illustrated in FIG. 8, the fourth wiring layer 13D has a leading wiring line 313 that is electrically connected to the wiring line leading unit 311 of the transmitting unit 31A through the contact hole and a dummy wiring line 314 that is electrically connected with the dummy wiring line connecting unit 312. The leading wiring line 313 and the dummy wiring line 314 are formed in a point symmetrical position with the center of the spindle 7 as a reference at the same interval as described above. The fourth wiring layer 13D has leading wiring lines 324 to 326 to receive a signal from the receiving coil 32.

[Configuration of Rotor According to First Embodiment]

Figure 9:
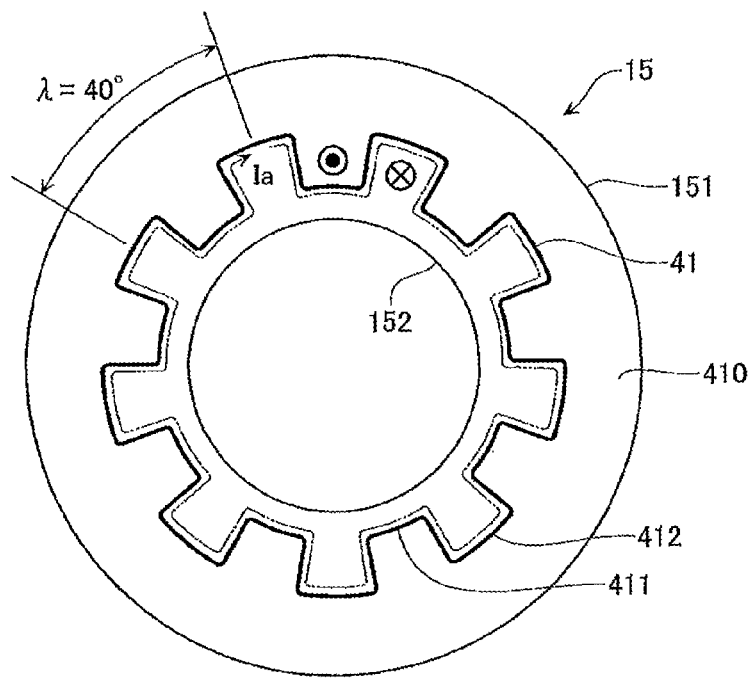
FIG. 9 is a view illustrating a configuration of a rotor of the micrometer.

Next, a configuration of the rotor 15 will be described with reference to FIG. 9. FIG. 9 is a view illustrating a configuration on the rotor 15. The rotor 15 has a magnetic flux coupling coil 41. A rotor main body 151 is configured by a resin wiring substrate 410 and an interlayer insulating layer laminated on the substrate. A through hole 152 for passing through the spindle 7 is formed in the center of the rotor main body 151. The interlayer insulating layer is deposited so as to bury the magnetic flux coupling coil 41.

The magnetic flux coupling coil 41 generates an inductive current based on a magnetic field generated by a transmitting current which flows in the transmitting coil 31. Further, the magnetic flux coupling coil 41 forms a track that is periodically changed in one cycle.

The magnetic flux coupling coil 41 is coaxially formed with the spindle 7 to have a gear shape. A first magnetic flux coupling coil 41 is configured to alternately dispose concave portions 411 recessed in a direction approaching the spindle 7 and convex portions 412 protruding in a direction away from the spindle 7. Further, in this embodiment, nine pairs of concave portions 411 and convex portions 412 are provided in the magnetic flux coupling coil 41. Therefore, if the rotor 15 rotates with respect to the stator 13 one revolution, signals corresponding to nine cycles are detected. In this case, a wavelength of a periodic pattern of the magnetic flux coupling coil 41 is λ (=40°).

[Operation and Effect of Inductive Detection Rotary Encoder 11 According to First Embodiment]

Figure 10:
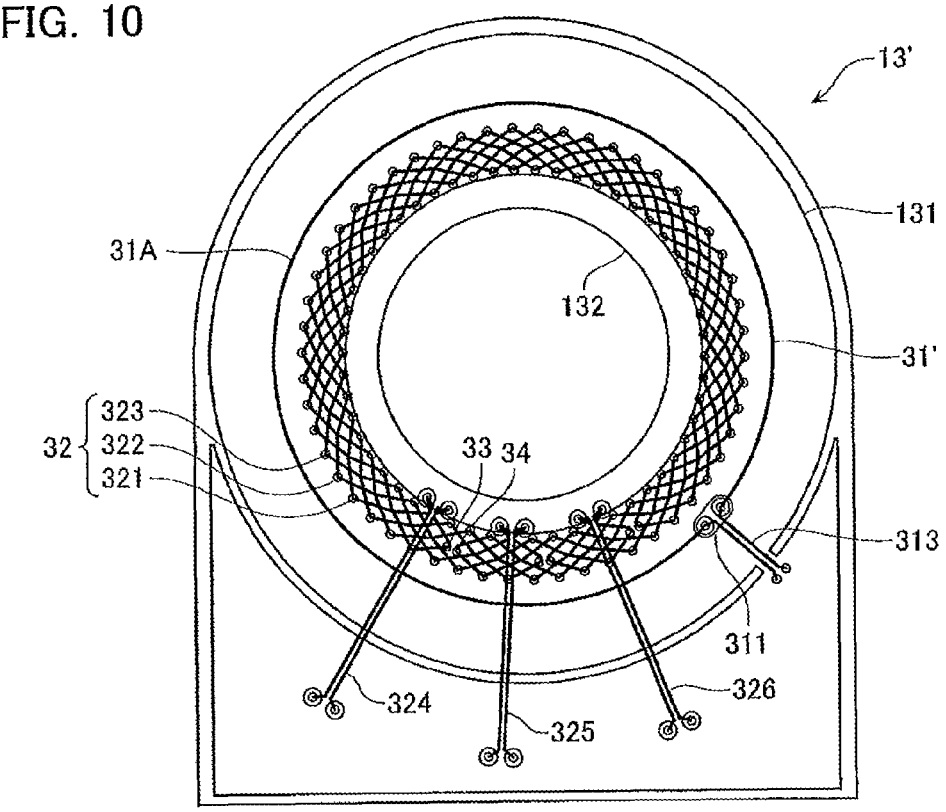
FIG. 10 is a view illustrating a configuration of a stator of a micrometer according to a comparative example.
Figure 11:
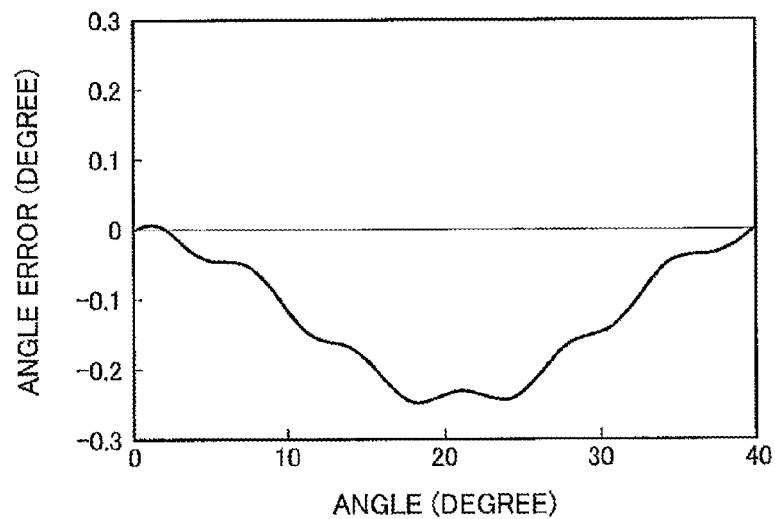
FIG. 11 is a view illustrating a relationship between a relative angle and a detected angle error of a rotor and the stator of the micrometer.
Figure 12:
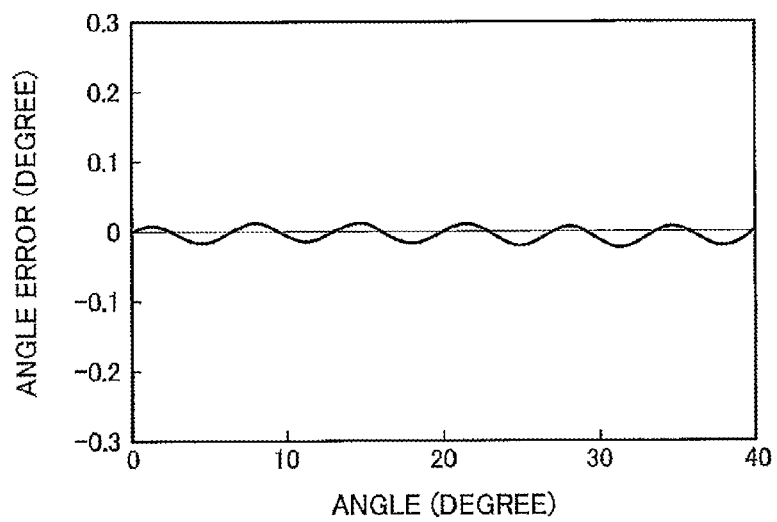
FIG. 12 is a view illustrating a relationship between a relative angle and a detected angle error of a rotor and the stator of the micrometer according to the first embodiment of the present invention.

Next, an operation and an effect of the inductive detection rotary encoder 11 according to the first embodiment will be described with reference to FIGS. 10 to 12, while comparing a comparative example. FIG. 10 is a view illustrating a configuration of a stator 13' according to the comparative example. FIGS. 11 and 12 are views illustrating a relationship between a relative angle and an angle error of the rotor and the stator in the comparative example and the embodiment.

As illustrated in FIG. 10, the configuration of the stator 13' according to the comparative example is basically the same as the stator 13 according to the first embodiment of the present invention. However, the difference between the two stators is that the dummy wiring line connecting unit 312 and the dummy wiring line 314 are not provided in the transmitting coil 31'.

It is considered that measurement is performed using a rotary encoder with this configuration according to the comparative example.

A magnetic field that is generated by flowing an alternating current in the transmitting coil 31 is coupled to the magnetic flux coupling coil 41 as illustrated in FIG. 9 and generates an inductive current Ia that flows along the concave portions 411 and the convex portions 412 in the magnetic flux coupling coil 41, for example, in a clockwise direction. The inductive current Ia generates a magnetic field upward from the plane of paper in the concave portion 411 and a magnetic flux downward from the plane of paper in the convex portion 412. The magnetic field having a periodic pattern in a circumferential direction is magnetic-flux coupled with a receiving loop of the receiving coil 32 and generates an inductive current in the receiving coil 32. The inductive current varies by the position in the rotational direction of the receiving coil 32 and the magnetic flux coupling coil 41. The inductive current is received from the receiving coil 32.

Here, if the transmitting coil 31' is formed in an ideal circular shape, ideal three phase periodic signals having the same amplitude are detected in the three phase receiving coils 321 to 323 in accordance with the rotational angle of the rotor 15. The three phase received signals are subjected to an arithmetic processing to detect a relative angle of the rotor 15 and the stator 13'.

However, actually, a wiring line leading unit 311 for supplying power needs to be provided in the transmitting coil 31' and the magnetic field which is generated in the transmitting coil 31' is not uniform. Here, a pattern that impairs the uniformity and periodicity of a magnetic field pattern likes the wiring line leading unit 311 is referred to as a "specific pattern". Due to the existence of the wiring line leading unit 311, among the receiving coils 321 to 323, a received signal obtained from a receiving coil closest to the wiring line leading unit 311 is increased or decreased, and the balance with the received signals obtained from the other receiving coils is lost to cause the angle error.

In contrast, according to the embodiment, the dummy wiring line connecting unit 312 and the dummy wiring line 314 are provided in a position separated from the wiring line leading unit 311 and the leading wiring line 313 by (n+½)λ in a rotational direction (measurement direction). Therefore, if an influence of the wiring line leading unit 311 on the receiving coil (for example, 321) closest to the wiring line leading unit 311 may increase the magnetic flux density, the influence of the dummy wiring connecting unit 312 on the receiving coil (for example, a reverse phase of 321) closest to the dummy wiring line connecting unit 312 may reduce the magnetic flux density. As a result, the increase and decrease of the current flowing in the receiving coil (for example, 321) are counterbalanced to be the same as the current flowing in other receiving coils.

By doing this, the current flowing in the transmitting coils 321 to 323 may be prevented from being unbalanced and the occurrence of the angle error may be prevented.

FIGS. 11 and 12 are views illustrating a relationship between a rotational angle and a detected angle error when the rotor 15 rotates around the stator 13 or 13' for one wavelength λ, that is, at 40°. FIG. 11 illustrates when the dummy pattern is not provided and FIG. 12 illustrates when the dummy pattern is provided.

When the dummy pattern is not provided, as apparently understood from FIG. 11, whenever the rotor 15 rotates around the stator 13' at 40°, an error of 0.2° to 0.3° is generated.

In contrast, as illustrated in FIG. 12, in the embodiment where the dummy pattern is provided, the error is significantly restricted and an S/N ratio is improved 10 times or higher than that in the comparative example.

Figure 13:
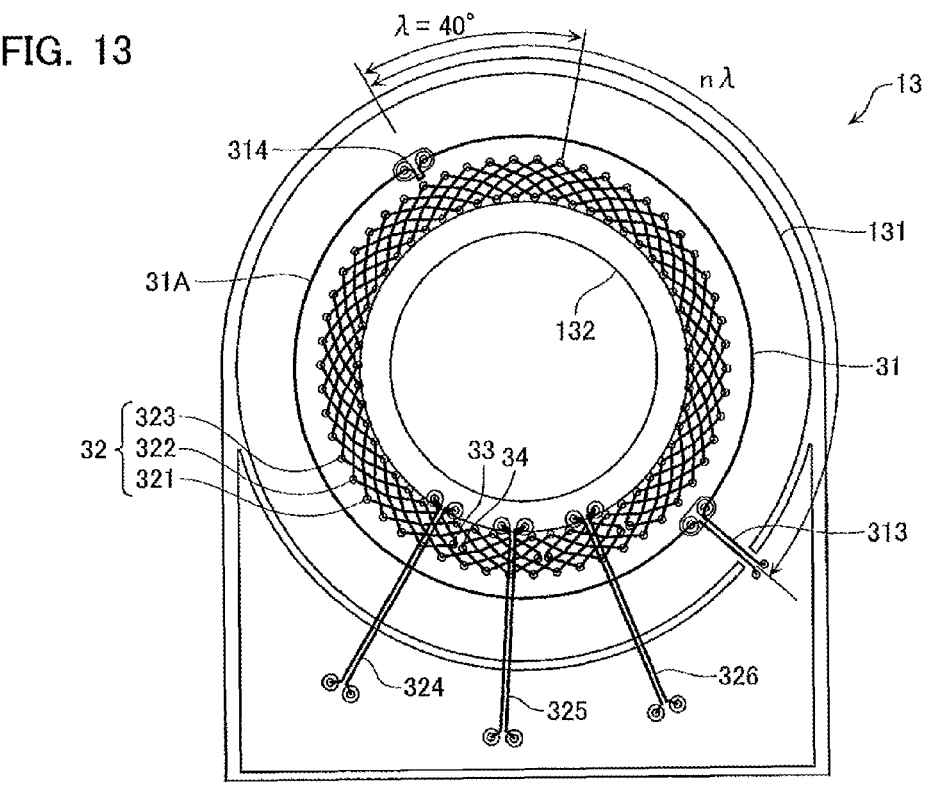
FIG. 13 is a view illustrating another configuration example of a stator of a micrometer according to the embodiment.

Further, in the embodiment, the wiring line leading unit 311 and the leading wiring line 313 and the dummy wiring line connecting unit 312 and the dummy wiring line 314 are disposed in a position of $(n+½)λ$. However, if the dummy wiring line connecting unit 312 and the dummy wiring line 314 and the wiring line leading unit 311 and the leading wiring line 313 are patterns that reversely affect the magnetic field generated by the transmitting coil 31, the distance therebetween may be $nλ$. As this pattern, for example, as illustrated in FIG. 13, it is considered to provide a pattern that extends in a central direction of the stator 13 rather than a pattern which is led to the outside of the transmitting coil 31 as illustrated in FIG. 13.

[Second Embodiment]

Next, an inductive detection encoder according to a second embodiment of the present invention will be described. In the first embodiment, the dummy wiring line connecting unit 312 and the dummy wiring line 314 are provided in the transmitting coil 31 as the dummy patterns for canceling out a noise caused by the wiring line leading unit 311 and the leading wiring line 313. In contrast, in the inductive detection encoder according to this embodiment, as a dummy pattern for canceling out a noise caused by the leading wiring lines 324 to 326 provided in the receiving coil 32, dummy wiring lines 327 to 329 are provided in the receiving coil 32.

Figure 14:
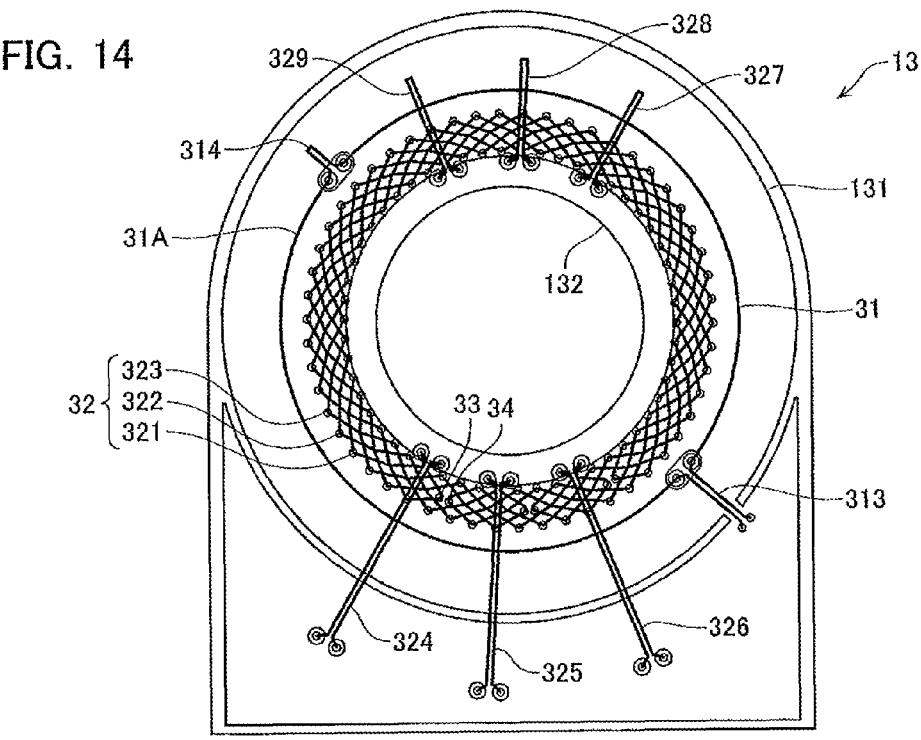
FIG. 14 is a view illustrating a configuration example of a stator of a digital micrometer in which an inductive detection rotary encoder according to a second embodiment of the present invention is mounted.

FIG. 14 is a view illustrating a configuration of a stator 13 according to this embodiment. The same parts as in the first embodiment may be denoted by the same reference numerals and the description thereof will be omitted. In this embodiment, each of the receiving coils 321 to 323 has leading wiring lines 324 to 326 and dummy wiring lines 327 to 329. The leading wiring lines 324 to 326 and the dummy wiring lines 327 to 329 are disposed so as to be spaced apart from each other with an interval of $(n+½)λ$. In this example, $λ=40°$ and $n=4$, and the leading wiring lines 324 to 326 and the dummy wiring lines 327 to 329 are disposed in point symmetrical positions with the center of the spindle 7 as a reference. Further, in this embodiment, a dummy pattern 314 may be or may not be provided in the transmitting coil 31.

When a magnetic field which is generated in the leading wiring lines 324 to 326 is affected by a magnetic field which is generated by the transmitting coil 31 intersecting the leading wiring lines 324 to 326, if both the magnetic fields are in the same direction, the reception current that flows in the receiving coils 321 to 323 increases. However, since the direction of the magnetic field generated between the dummy wiring lines 327 to 329 is different from the direction of the magnetic field generated between the leading wiring lines 324 to 326 in this embodiment, the magnetic field serves to decrease the reception current in a portion of the dummy wiring lines 327 to 329. In other words, an influence of the magnetic field on the reception current at a portion where the leading wiring lines 324-326 and the transmitting coil 31 intersect each other is cancelled out by an influence of the magnetic field on the reception current at a portion where the dummy wiring lines 327 to 329 and the transmitting coil 31 intersect each other, which may reduce the measurement error.

Figure 15:
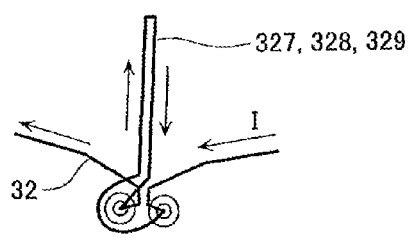
FIG. 15 is a view illustrating a configuration example of another dummy pattern of the stator of the micrometer according to the embodiment.

In addition, for example, as illustrated in FIG. 15, when a pattern in which connecting edges of the wiring line pairs of the dummy wiring lines 327 to 329 with the receiving coil 32 are switched is used, it is possible to set an interval between the leading wiring lines 324 to 326 and the dummy wiring lines 327 to 329 to $nλ$.

If the wiring line pairs of the leading wiring lines 324 to 326 are formed on different wiring layers and both are disposed so as to overlap with each other in a laminated direction, it is possible to avoid the problems of crosstalk with the transmitting coil 31 in the leading wiring lines 324 to 326 as described in the embodiment (for example, see Japanese Published Patent Application No. 2005-164332). However, in this case, at least three layers are required to form the leading wiring lines 324 to 326 and the stator 13 needs to be configured, for example, by six layers.

In contrast, according to the embodiment, since the leading wiring lines 324 to 326 may be formed on the same wiring layer, the stator 13 may be configured, for example, by four layers as described in the first embodiment, which may reduce the overall size and the cost.

[Third Embodiment]

Figure 16:
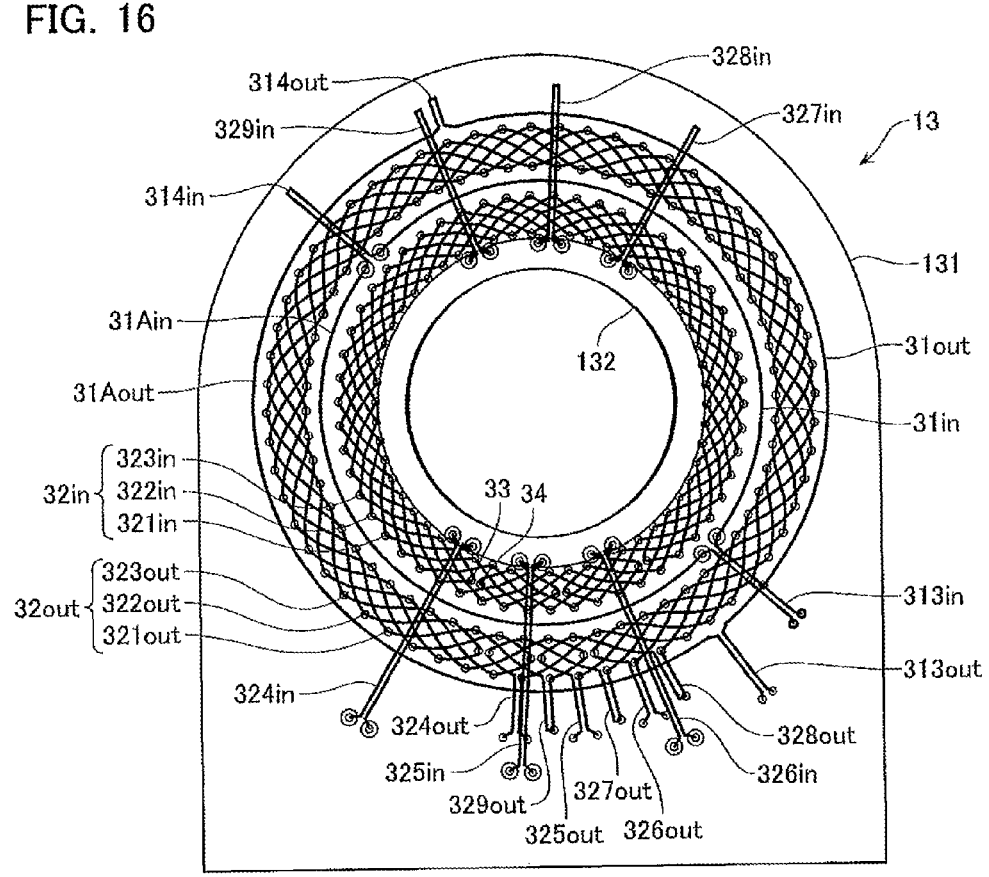
FIG. 16 is a view illustrating a configuration example of a stator of a digital micrometer in which an inductive detection rotary encoder according to a third embodiment of the present invention is mounted.

Next, an inductive detection encoder according to a third embodiment of the present invention will be described with reference to FIG. 16. The inductive detection encoders according to the first and second embodiments have a one-track configuration but the inductive detection encoder according to this embodiment has a two-track configuration. In other words, in a stator 13 of the inductive detection encoder according to this embodiment, as illustrated in FIG. 16, an inner track having a transmitting coil 31in and a receiving coil 32in and an outer track having a transmitting coil 31out and a receiving coil 32out are provided. In the transmitting coils 31in and 31out, similarly to the first embodiment, dummy patterns 314in and 314out are provided, respectively. Similarly to the second embodiment, in the receiving coils 32in and 32out, dummy patterns 327in to 329in and dummy patterns 327out to 329out are provided, respectively.

Since the inductive detection encoder according to this embodiment is a two track type, a cycle formed by the inner track is odd-numbered (or even-numbered) and a cycle formed by the outer track is even-numbered (or odd-numbered) to configure an ABS (absolute position detection) rotary encoder. Such an ABS rotary encoder may also suppress a noise caused by the leading wiring lines 313in and 313out by the dummy patterns 314in and 314out and may be configured by three wiring layers.

[Fourth Embodiment]

Figure 17:
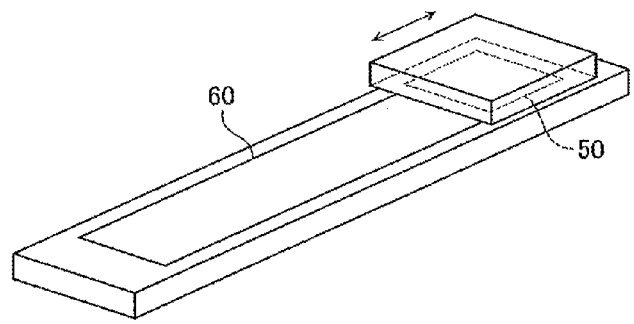
FIG. 17 is a schematic view illustrating a configuration of a digital micrometer according to a fourth embodiment of the present invention.
Figure 18:
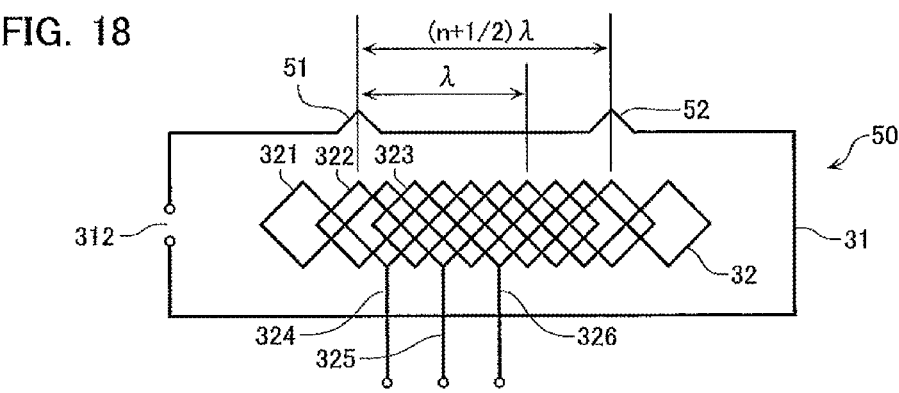
FIG. 18 is a view illustrating a configuration example of a detecting head of a digital micrometer in which an inductive detection linear encoder according to the embodiment is mounted.
Figure 19:
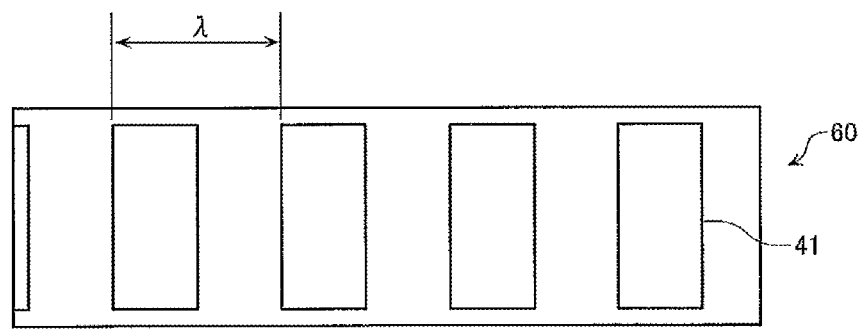
FIG. 19 is a view illustrating a configuration example of a scale of the micrometer.

Next, a fourth embodiment of the present invention will be described. The first to third embodiments relate to the rotary encoder but a linear encoder may also cancel out the noise by providing a dummy pattern in a transmitting coil and a receiving coil. FIG. 17 is a schematic view illustrating a configuration of a digital linear encoder according to this embodiment. The digital linear encoder according to this embodiment includes a scale 60 and a detecting head 50 which is configured so as to move in parallel to the length direction of the scale 60. FIG. 18 is a view illustrating a part of a configuration of the detecting head 50 of a linear encoder according to the embodiment. The detecting head 50 according to the embodiment includes a transmitting coil 31 formed on a surface opposite to the scale 60 and a receiving coil 32 periodically formed with a wavelength along a measurement axis direction on a surface opposite to the scale 60. On the opposite surface of the detecting head 50, the scale 60 illustrated in FIG. 19 is disposed so as to move in parallel to the measurement axis direction (longer direction of the scale 60). The scale 60 is formed along the measurement direction on a surface opposite to the detecting head 50 and has a magnetic flux coupled body 41 that is magnetic-flux coupled with the receiving coil 32, which will be described below. Further, the magnetic flux coupled body 41 forms a track which is periodically changed with a wavelength λ in accordance with a predetermined movement in the measurement axis direction.

Figure 20:
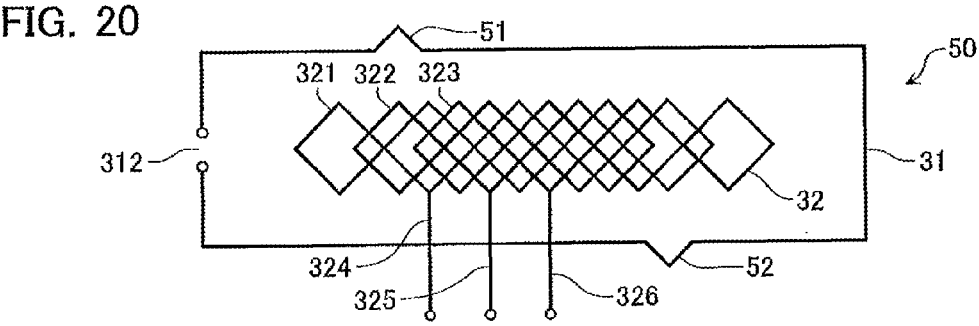
FIG. 20 is a view illustrating another configuration example of a detecting head of the micrometer.
Figure 21:
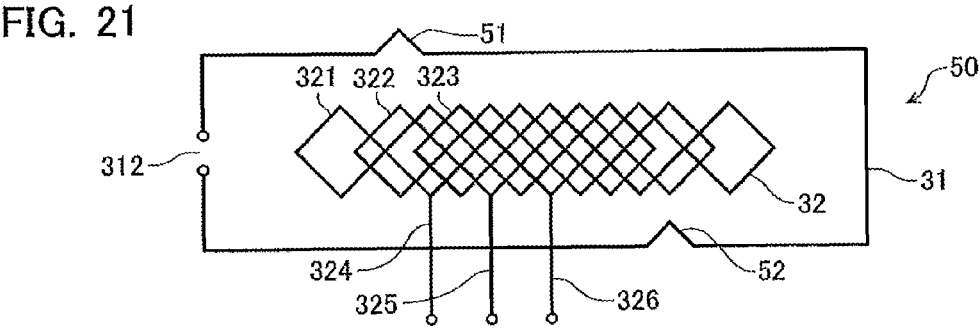
FIG. 21 is a view illustrating another configuration example of a detecting head of the micrometer.

As illustrated in FIG. 18, when a specific pattern 51 that breaks the symmetrical property of the transmitting coil 31 is present in a part of the transmitting coil 31, similarly to the first embodiment, if a parallel movement amount for one wavelength is λ and an integer is n, a dummy pattern 52 may be provided in a location spaced apart from the pattern 51 by (n+½)λ. Further, in case of the linear encoder, as illustrated in FIG. 20, the dummy pattern 52 may be provided at opposite side to a location spaced apart from the pattern 51 by (n+½)λ. Further, as illustrated in FIG. 21, if the specific pattern 51 is a pattern which is led to the outside of the transmitting coil 31, a pattern which extends inside the receiving coil 31 may be provided as the dummy pattern 52.

[Fifth Embodiment]

Figure 22:
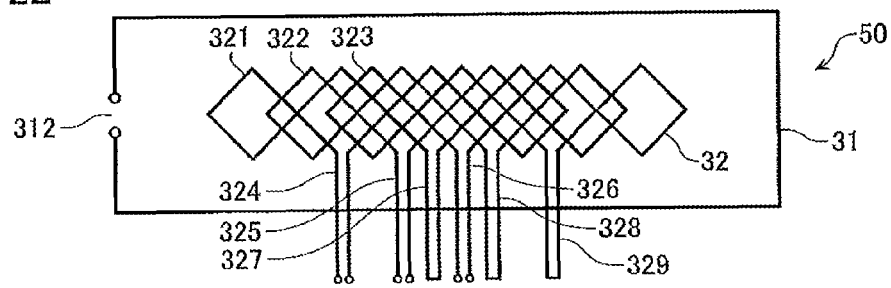
FIG. 22 is a view illustrating a configuration example of a detecting head of a digital micrometer in which an inductive detection linear encoder according to a fifth embodiment of the present invention is mounted.
Figure 23:
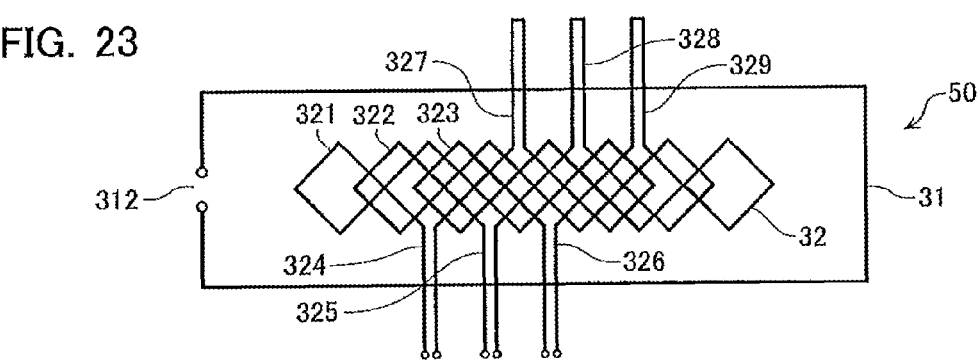
FIG. 23 is a view illustrating another configuration example of the detecting head.
Figure 24:
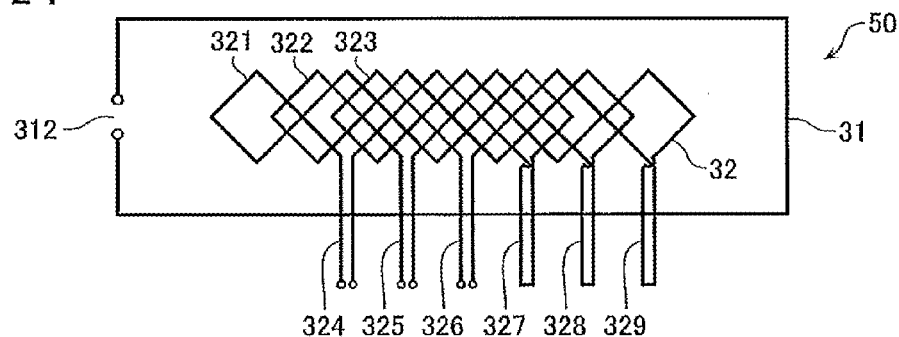
FIG. 24 is a view illustrating another configuration example of the detecting head.

Next, a fifth embodiment of the present invention will be described. With respect to the receiving coil 32 of the linear encoder, similarly to the second embodiment, dummy patterns 327 to 329 that cancel out the noise caused by the leading wiring lines 324 to 326 of the receiving coil may be formed. Also in this case, as illustrated in FIG. 22, the dummy patterns 327 to 329 may be provided at the same side as the leading wiring lines 324 to 326 or at the opposite side thereof as illustrated in FIG. 23. Further, as illustrated in FIG. 24, when a pattern in which connecting edges of the wiring line pairs of the dummy wiring lines 327 to 329 with the receiving coil 32 are switched is used, it is possible to set an interval between the leading wiring lines 324 to 326 and the dummy wiring lines 327 to 329 to nλ.

Figure 25:
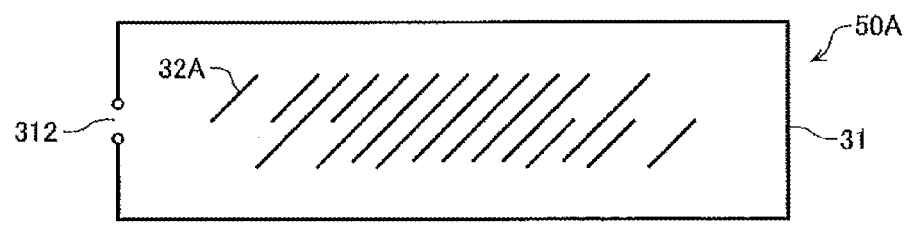
FIG. 25 is a view illustrating a first wiring layer of the detecting head.
Figure 26:
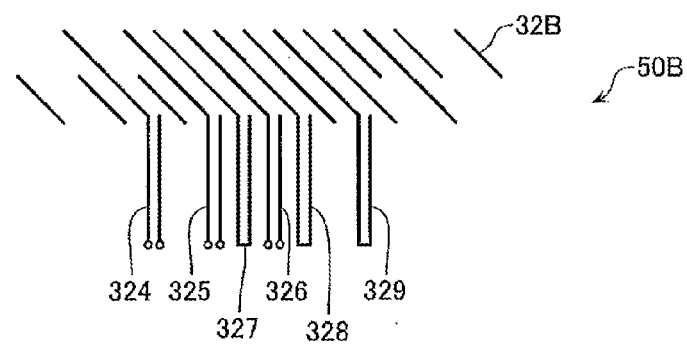
FIG. 26 is a view illustrating a second wiring layer of the detecting head.

Further, the detecting head 50 of the linear encoder according to this embodiment may be configured, for example, by a first wiring layer 50A and a second wiring layer 508 illustrated in FIGS. 25 and 26. As illustrated in FIG. 25, the first wiring layer 50A has a transmitting coil 31 formed on a wiring substrate which is not illustrated and a wiring line 32A which is a part of a receiving coil 32. The wiring line 32A is formed of a plurality of wiring lines whose upper edges are inclined in a predetermined direction (a right direction in FIG. 25). As illustrated in FIG. 26, the second wiring layer 50B has a wiring line 328 which is a part of the receiving coil 32 formed on a wiring substrate which is not illustrated, leading wiring lines 324 to 326, and dummy wiring lines 327 to 329. The wiring line 32B is formed of a plurality of wiring lines whose upper edges are inclined in an opposite direction of the predetermined direction (a left direction in FIG. 26) and electrically connected to the wiring line 32A through a contact hole formed in a wiring substrate which is not illustrated to configure the receiving coil 32. With this configuration, it is possible to configure a detecting head 50 of a linear encoder formed of two wiring layers, which may reduce the number of components as compared with the configuration of the related art.

Figure 27:
FIG. 27 is a view illustrating another configuration example of a second wiring layer of the detecting head.
Figure 28:
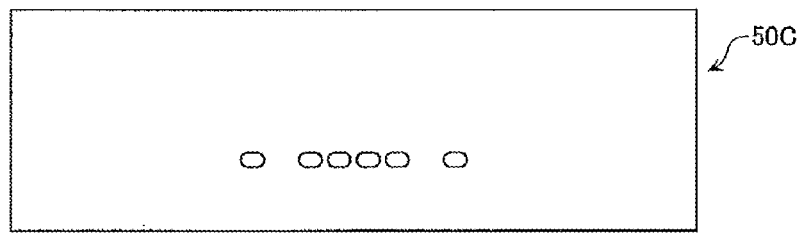
FIG. 28 is a view illustrating a third wiring layer of the detecting head.
Figure 29:
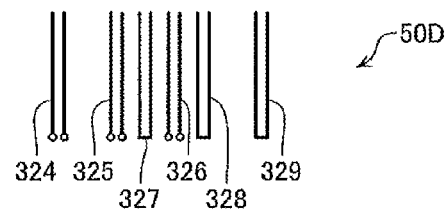
FIG. 29 is a view illustrating a fourth wiring layer of the detecting head.

Further, the detecting head 50 of the linear encoder according to this embodiment may be configured by a second wiring layer 50B', a third wiring layer 50C, and a fourth wiring layer SOD illustrated in FIGS. 27 to 29 instead of the second wiring layer 50B illustrated in FIG. 26. The second wiring layer 50B' illustrated in FIG. 27 is basically configured similarly to the second wiring layer 50B, however, the second wiring layer 50B' does not have the leading wiring lines 324 to 326 and the dummy wiring lines 327 to 329 but has only wiring line 32B, which is different from the second wiring layer 50B. The third wiring layer 50C illustrated in FIG. 28 is formed of a magnetic shield wiring line formed on a wiring substrate which is not illustrated. The fourth wiring layer 50D illustrated in FIG. 29 has leading wiring lines 324 to 326 formed on a wiring substrate which is not illustrated and dummy wiring lines 327 to 329. With this configuration, the magnetic shield wiring line is provided between the second wiring layer 50B' and the fourth wiring layer 50D, so that improvement of measurement precision is expected.

[Sixth Embodiment]

Figure 30:
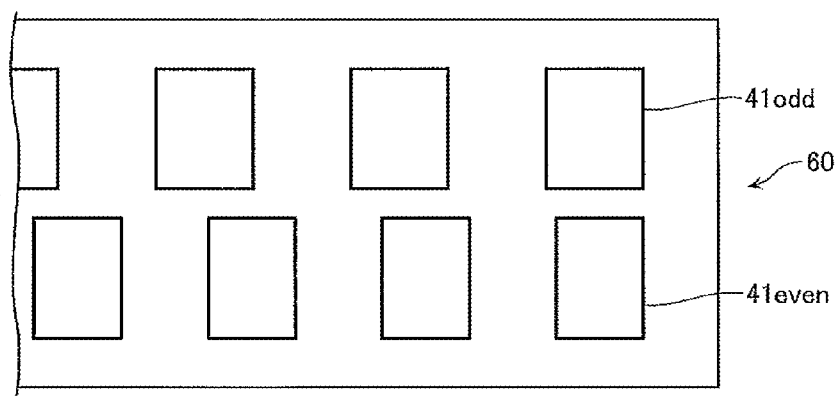
FIG. 30 is a view illustrating a configuration example of a scale of a digital micrometer in which an inductive detection linear encoder according to a sixth embodiment of the present invention is mounted.
Figure 31:
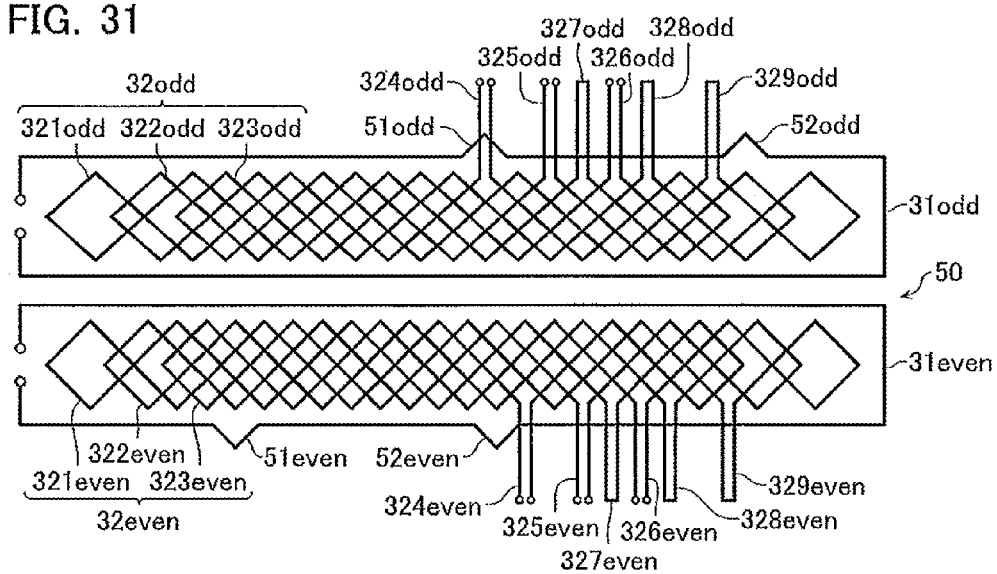
FIG. 31 is a view illustrating a configuration example of the detecting head of the micrometer.

Next, a sixth embodiment of the present invention will be described. An inductive detection encoder according to this embodiment is an ABS type linear encoder. In other words, as illustrated in FIGS. 30 and 31, the inductive detection encoder according to this embodiment has a two-track configuration. In the scale 60 according to this embodiment, a magnetic flux coupled body 41even corresponding to an even-numbered track and a magnetic flux coupled body 41odd corresponding to an odd-numbered track are formed as illustrated in FIG. 30. Further, in a detecting head 50 according to this embodiment, as illustrated in FIG. 31, an even-numbered track having a transmitting coil 31even and a receiving coil 32even and an odd-numbered track having a transmitting coil 31odd and a receiving coil 32odd are provided. In the transmitting coils 31even and 31odd, dummy patterns 52even and 52odd are provided, respectively. Similarly, in the receiving coils 32even and 32odd, dummy patterns 327even to 329even and dummy patterns 327odd to 329odd are provided, respectively, which is similar to the fifth embodiment.

[Other Embodiments]

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, rather than the magnetic flux coupling coil as described in the above embodiments, the magnetic flux coupled body may be an electrode, a hole formed in a conductive plate, or a concave portion. Further, the cycle of a track that forms the magnetic flux coupled body may be appropriately changed.

What is claimed is:

1. An inductive detection encoder, comprising:
   first and second members which are oppositely disposed so as to relatively move in a measurement direction;
   a transmitting coil formed in the first member;
   a magnetic flux coupled body which is formed in the second member and coupled with a magnetic field generated by the transmitting coil to generate a track in which the magnetic field is periodically changed in the measurement direction; and
   a receiving coil formed in the first member and having receiving loops periodically formed along the measurement direction corresponding to the track of the magnetic flux coupled body,
   at least one of the transmitting coil and the receiving coil having:
   a specific pattern that impairs the uniformity and periodicity of a pattern; and
   a dummy pattern formed in a position corresponding to a specific phase relationship of a cycle generated by the track with respect to the specific pattern, and
   when the wavelength of the receiving coil in the measurement direction is λ, the specific pattern and the dummy pattern are formed to be the same patterns in locations spaced apart from each other by (n+[½])λ (in this case, n is an arbitrary integer).

2. The inductive detection encoder according to claim 1, wherein the specific pattern is a wiring line leading unit and a leading wiring line configured to lead a wiring line from at least one of the transmitting coil and the receiving coil.

3. The inductive detection encoder according to claim 2, wherein the first member includes:
   a first wiring layer having a part of the receiving coil and the transmitting coil; and
   a second wiring layer having the remaining part of the receiving coil that forms the receiving coil together with the part of the receiving coil in the first wiring layer, and
   the leading wiring line configured to lead the wiring line from the receiving coil and the dummy pattern are formed on the same wiring layer other than the first wiring layer.

4. The inductive detection encoder according to claim 3, wherein the first member further includes:
   a third wiring layer having a magnetic shield wiring line; and
   a fourth wiring layer having the leading wiring line and the dummy pattern.

5. The inductive detection encoder according to claim 3, wherein the second wiring layer further includes the leading wiring line and the dummy pattern.

6. The inductive detection encoder according to claim 1, wherein
   the receiving coil is formed of multiple phase coils whose phases in the measurement direction are varied, and
   the specific pattern and the dummy pattern are formed in the transmitting coil and formed close to a specific phase coil of the receiving coil.

7. The inductive detection encoder according to claim 1, wherein the specific pattern and the dummy pattern are formed in the receiving coil so as to make the currents flowing in the receiving coil generated by being coupled with the transmitting coil be reverse to each other.

8. An inductive detection encoder, comprising:
   first and second members which are oppositely disposed so as to relatively move in a measurement direction;
   a transmitting coil formed in the first member;
   a magnetic flux coupled body which is formed in the second member and coupled with a magnetic field generated by the transmitting coil to generate a track in which the magnetic field is periodically changed in the measurement direction; and
   a receiving coil formed in the first member and having receiving loops periodically formed along the measurement direction corresponding to the track of the magnetic flux coupled body,
   at least one of the transmitting coil and the receiving coil having:
   a specific pattern that impairs the uniformity and periodicity of a pattern; and
   a dummy pattern formed in a position corresponding to a specific phase relationship of a cycle generated by the track with respect to the specific pattern, and
   when the wavelength of the receiving coil in the measurement direction is $\lambda$, the specific pattern and the dummy pattern are formed in locations spaced apart from each other by $n\lambda$ (in this case, n is an arbitrary integer) as patterns which affect the receiving coil in reverse directions.

9. The inductive detection encoder according to claim 8, wherein
   the transmitting coil has the specific pattern and the dummy pattern,
   the specific pattern is a pattern that is led outside the transmitting coil, and
   the patterns that affect in the reverse directions are patterns that extend in the transmitting coil.

10. The inductive detection encoder according to claim 8, wherein
    the receiving coil has the specific pattern and the dummy pattern, and
    the dummy pattern forms the same pattern as the specific pattern and connecting edges of the dummy pattern with the receiving coil are switched.

11. The inductive detection encoder according to claim 1, wherein
    the transmitting coil includes a first transmitting coil and a second transmitting coil which are independently formed in the first member,
    the magnetic flux coupled body includes first and second magnetic flux coupled bodies which are independently formed in the second member and respectively coupled with the magnetic fields generated by the first and second transmitting coils to generate tracks in which the magnetic field in the measurement direction is periodically changed, and
    the receiving coil includes first and second receiving coils which are independently formed in the first member and have receiving loops which are periodically formed along the measurement direction corresponding to the tracks of the first and second magnetic flux coupled bodies.

12. The inductive detection encoder according to claim 11, wherein in the first and second transmitting coils and the first and second receiving coils, the dummy patterns are formed respectively.

13. The inductive detection encoder according to claim 11, wherein a cycle generated by the track of the first magnetic flux coupled body is odd-numbered and a cycle generated by the track of the second magnetic flux coupled body is even-numbered.

14. A digital micrometer comprising an inductive detection encoder which has:
    first and second members which are oppositely disposed so as to relatively move in a measurement direction;
    a transmitting coil formed in the first member;
    a magnetic flux coupled body which is formed in the second member and coupled with a magnetic field generated by the transmitting coil to generate a track in which the magnetic field is periodically changed in the measurement direction; and
    a receiving coil formed in the first member and having receiving loops periodically formed along the measurement direction corresponding to the track of the magnetic flux coupled body,
    at least one of the transmitting coil and the receiving coil having:
    a specific pattern that impairs the uniformity and periodicity of a pattern; and
    a dummy pattern formed in a position corresponding to a specific phase relationship of a cycle generated by the track with respect to the specific pattern, and
    when the wavelength of the receiving coil in the measurement direction is $\lambda$, the specific pattern and the dummy pattern are formed to be the same patterns in locations spaced apart from each other by $(n+[½])\lambda$ (in this case, n is an arbitrary integer).

15. The digital micrometer according to claim 14, wherein the specific pattern is a wiring line leading unit and a leading wiring line configured to lead a wiring line from at least one of the transmitting coil and the receiving coil.

16. The digital micrometer according to claim 14, wherein the receiving coil is formed of multiple phase coils whose phases in the measurement direction are varied, and the specific pattern and the dummy pattern are formed in the transmitting coil and formed close to a specific phase coil of the receiving coil.

17. The digital micrometer according to claim 14, wherein the specific pattern and the dummy pattern are formed in the receiving coil so as to make the currents flowing in the receiving coil generated by being coupled with the transmitting coil be reverse to each other.

18. A digital micrometer comprising an inductive detection encoder which has:

first and second members which are oppositely disposed so as to relatively move in a measurement direction;

a transmitting coil formed in the first member;

a magnetic flux coupled body which is formed in the second member and coupled with a magnetic field generated by the transmitting coil to generate a track in which the magnetic field is periodically changed in the measurement direction; and a receiving coil formed in the first member and having receiving loops periodically formed along the measurement direction corresponding to the track of the magnetic flux coupled body, at least one of the transmitting coil and the receiving coil having:

a specific pattern that impairs the uniformity and periodicity of a pattern; and a dummy pattern formed in a position corresponding to a specific phase relationship of a cycle generated by the track with respect to the specific pattern, and when the wavelength of the receiving coil in the measurement direction is $\lambda$, the specific pattern and the dummy pattern are formed in locations spaced apart from each other by $n\lambda$ (in this case, n is an arbitrary integer) as patterns which affect the receiving coil in reverse directions.

* * * * *